(12) United States Patent
Livache et al.

(10) Patent No.: US 6,207,797 B1
(45) Date of Patent: Mar. 27, 2001

(54) METHOD FOR REDUCING THE SURFACE REACTIVITY OF COPOLYMERS PRODUCED BY ELECTROCHEMICAL POLYMERIZATION

(75) Inventors: Thierry Livache, Haute-Jarrie; André Roget, Saint-Egrève; Robert Teoule, Grenoble, all of (FR)

(73) Assignee: CIS BIO International, Saclay (FR)

( * ) Notice: Subject to any disclaimer, the term of this patent is extended or adjusted under 35 U.S.C. 154(b) by 0 days.

(21) Appl. No.: 09/091,397
(22) PCT Filed: Dec. 13, 1996
(86) PCT No.: PCT/FR96/02003
 § 371 Date: Jun. 19, 1998
 § 102(e) Date: Jun. 19, 1998
(87) PCT Pub. No.: WO97/22648
 PCT Pub. Date: Jun. 26, 1997

(30) Foreign Application Priority Data

Dec. 19, 1995 (FR) .................................................. 95 15044

(51) Int. Cl.[7] ..................................................... A61K 38/00
(52) U.S. Cl. ............................................ 530/333; 536/25.3
(58) Field of Search ...................................... 530/300, 333, 530/350; 536/22.1, 25.3

(56) References Cited

U.S. PATENT DOCUMENTS 5,837,859 * 11/1998 Teoule et al. ........................ 536/25.3

FOREIGN PATENT DOCUMENTS

9529199 * 11/1995 (WO).

* cited by examiner

Primary Examiner—Ardin H. Marschel
(74) Attorney, Agent, or Firm—Oblon, Spivak, McClelland, Maier & Neustadt, P.C.

(57) ABSTRACT

A method for preparing a copolymer of general formula (I) by electrochemically copolymerising a compound of general formula (II) with a compound [A], wherein [A] is a monomeric unit of a polymer capable of being produced by electrochemical copolymerisation, [B] is a side group that may be a monomer or a polymer and is bound to unit [A] by a covalent bond or via a spacer arm, and x and y are integers of a least 1. Said method includes a treatment enabling the surface reactivity of said copolymer to be reduced.

7 Claims, No Drawings

METHOD FOR REDUCING THE SURFACE REACTIVITY OF COPOLYMERS PRODUCED BY ELECTROCHEMICAL POLYMERIZATION

This application was filed under 35 U.S.C. §371 from PCT/FR96/02003, filed Dec. 13, 1996.

The present Invention relates to the treatment of polymers synthesized electrochemically, for the purpose of using them for the construction of addressed matrices.

Matrices of compounds having an affinity for biological products, for example matrices of peptides, of oligonucleotides, of receptors, and the like, can be constructed in several ways. Three main methods have been described: photochemically directed deposition [Fodor S. et al., Science, 251, 767–773 (1991)], mechanical deposition [Khrapko K. R. et al., DNA Sequencing and Mapping, 1, 375–338 (1991)] or electrochemically directed deposition [PCT International Application published under the number WO 94/22889; Livache et al., Nucl. Acids. Res., 22, 15, 2615–2921 (1994)].

Oligonucleotides can be deposited on different points of the support, either by in situ nucleotide synthesis [Fodor S. et al.; PCT Application WO 94/22889] or by successive attachments of presynthesized oligonucleotides [Fodor S. et al.; Khrapko K. R. et al.; PCT Application WO 94/22889].

In the first case, the entire surface of the support is washed after each addition of nucleotide. This washing operation serves simply to remove the excess reagent present on the support; it is in no way linked to the actual nature of the support.

In the second case (successive attachments of oligonucleotides), two types of treatment are described; some writers [Saiki R. K. et al., Proc. Natl. Acad. Sci. USA, 89, 6230–6234 (1989), Khrapko et al. (already cited) or Lamture et al., Nucl. Acids. Res., 22, 2121–2125 (1994)] carry out a single final washing of the support after the attachment of all the oligonucleotides. This washing with water or in a hybridization buffer makes it possible to remove the probes which have not reacted on the support. With the same aim, Livache et al. rinse the support with water between each attachment of oligonucleotide; in this case, there are therefore as many rinsing operations as there are coupling operations of oligonucleotides.

However, the Inventors have found that, when several depositions of polymers produced electrochemically are carried out at different points of the same electrode matrix, sporadic interelectrode contaminations can take place. Indeed, during the synthesis of a polymer on the electrode number n in the presence of the n oligonucleotide, contamination by the n oligonucleotide on the n−1 electrode, already covered by an n−1 oligonucleotide, can be observed. This results in a weakly positive signal of the n−1 spot during hybridization with the n oligonucleotide. This phenomenon can be illustrated by the results of four cross-hybridizations cited in the publication by Livache et al., Nucl. Acids. Res., 22, 15, 2615–2921 (1994). Two slight contaminations (approximately 10% of the maximum signal) are visible on the four deposits. They had been interpreted at the time as being non-specific hybridizations; however, subsequent experiments by the Inventors, involving different oligonucleotide sequences, have shown that they were in fact contaminations.

It is important, for diagnostic use of a matrix of oligonucleotides which are coupled to a support, for this type of contamination to be completely removed. Now, the washing treatments generally employed are insufficient to produce this result.

The present Invention had as aim the specific treatment of polymers produced electrochemically, in order to decrease, indeed eliminate, the sporadic phenomena of contamination.

With this aim, the Inventors studied the mechanism of electrochemical polymerization. It is known that this polymerization in particular involves radical reactions [Genies et al., J. Electroanal. Chem., 149, 101–113 (1993)] and, when an n−1 polymer is synthesized, it may possibly retain at the surface, for a certain period of time, reactive species capable of capturing products during the polymerization on the n electrode.

The Inventors have put forward the hypothesis that, by reducing the surface reactivity of the polymer, success would be achieved in removing the contaminations observed during the addressed synthesis of biological molecules at the surface of the said polymer.

The subject of the present Invention is a method for the synthesis of a copolymer by electrochemical copolymerization, characterized in that it comprises a treatment which makes it possible to reduce the surface reactivity of the said copolymer.

In particular, the subject of the present Invention is a method for preparing a copolymer of following general formula (I):

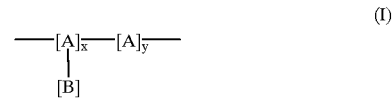

by electrochemical copolymerization of a compound of following general formula (II):

with a compound [A]

[A] representing a monomer unit of a polymer capable of being produced by electrochemical copolymerization, [B] representing a side group, which can be a monomer or a polymer, bonded to the unit [A] by a covalent bond or via a spacer arm, and x and y representing integers equal to or greater than 1, which method is characterized in that it comprises, on conclusion of the said electrochemical copolymerization, at least one stage where the copolymer produced is subjected to a treatment which makes it possible to reduce its surface reactivity.

Within the meaning of the present Invention, "surface reactivity" is understood to mean the persistence, at the surface of the copolymer formed, of reactive species capable of attaching a unit of formula (II) and "reduction of the surface reactivity" is understood to mean the at least partial inactivation of these reactive species which makes possible the attachment of only a zero or low amount of units of formula (II). The contaminations resulting from this attachment are thus eliminated or reduced until they are no longer detectable or until they only produce a negligible signal, readily distinguishable from a positive signal.

According to a preferred embodiment of the present Invention, [A] represents a monomer of electronically conductive polymer; the said electronically conductive polymer is preferably chosen from polyacetylene, polyazine, poly(p-phenylene), poly(p-phenylene vinylene), polypyrene, polypyrrole, polythiophene, polyfuran, polyselenophene, polypyridazine, polycarbazole, polyaniline and their substituted derivatives (the substituents can be, for example, saturated or unsaturated hydrocarbon chains (preferably $C_{1-3}$ chains), aromatic or non-aromatic rings, or heterocycles, and the like); the said electronically conductive polymer can also be a copolymer of two or more different monomers [A], for example pyrrole monomers and thiophene monomers.

Advantageously, [A] is a pyrrole unit.

According to a preferred embodiment of the present Invention, [B] represents a nucleotide, an oligonucleotide or one of their derivatives or analogues.

In the context of the description of the present Invention, nucleotide derivative or analogue, for example, is understood to mean modified nucleotides, such as those described by Uhlmann [Chemical Review, 90:4, 543–584 (1990)]; nucleotide analogues forming part of the composition of synthetic oligonucleotides; nucleotide derivatives carrying protected functional groups which are commonly used in the synthesis of nucleic acids.

[B] can also be a non-natural compound which can be hybridized with nucleic acids, such as those described by Uhlmann (abovementioned publication).

The Inventors have found that three types of treatment could be employed to reduce the reactivity of the polymers:
  a chemical treatment, based on products known for their antiradical activity or their inhibitory activity on radical polymerization;
  an electrochemical treatment which makes it possible to reduce or to overoxidize the polymer;
  rinsing in the presence of products capable of removing the short growing polymer chains adsorbed on the support.

According to a preferred embodiment of the present Invention, the treatment employed for reducing the surface reactivity of the copolymer comprises at least:
  one antiradical chemical treatment; or else
  one electrochemical treatment which makes it possible to modify the degree of oxidation of the said polymer; or else
  one treatment comprising at least one rinsing operation in the presence of a surface-active agent, or else a combination of at least two from the three above treatments.

A chemical treatment in accordance with the Invention can be employed in a simple way by rinsing the polymer with a solution containing an antiradical product.

Advantageously, antioxidants such as tocopherol derivatives (family of vitamin E) are used. It is also advantageous to use inhibitors or retarders of radical polymerization, such as, for example, nitrobenzene or benzoquinones, which are conventional retarders of the polymerization of styrene [Odian G., Principles of Polymerization, John Wiley & Sons, Interscience Publication (1981)]. This is because these products, dissolved in an appropriate solvent (for example, water, acetonitrile, ethanol or a mixture of these solvents), have also proved to be active with respect to the reactivity of polymers manufactured electrochemically (polypyrrole, for example).

The electrochemical treatment can be carried out by reducing or by oxidizing the conductive polymer in a controlled way, for example in a 3-electrode electrochemical system. A potential range in which [B] is stable (for example, from −1 to +1 V/SCE for nucleic acids) will be chosen in implementing this treatment.

Rinsing in the presence of surface-active agents makes it possible to remove short chains of conductive polymer which are still reactive. Each rinsing operation by a solution containing a surface-active agent should preferably be followed by one or more rinsing operations targeted at removing traces of surfactant. When the treatment is carried out on charged polymers (such as, for example, polypyrrole in its oxidized form), non-ionic surface-active agents, which will be easier to remove, will preferably be chosen.

The method in accordance with the present Invention is more particularly intended to be employed during the synthesis of an array of copolymers of general formula (I), at least two of which comprise a different side group [B], on the same support, the surface of which is composed of electrodes arranged as a matrix, the copolymers comprising a different side group [B] being carried by different electrodes. In this context, the copolymers of general formula (I) are synthesized one after the other, each on its respective electrode-support, by employing a method in accordance with the Invention as defined above. In other words, after the synthesis of each copolymer, a treatment is carried out which has the aim of reducing its surface reactivity and which makes it possible to prevent it being contaminated by reagents used in the synthesis of the following polymer.

The use of a treatment method in accordance with the Invention thus makes it possible, in contrast to rinsing operations with water or with a buffer, to remove interelectrode contaminations and to produce a matrix of completely distinctive plots. The treatments in accordance with the Invention are easy to carry out and can be automated.

In all cases, the conductive polymer support carrying the molecule of biological interest is manufactured, for example, according to the method described in Patent WO 94/22889. Only the treatments carried out after the synthesis of each deposit differ.

The present Invention will be better understood with the help of the additional following description, which refers to examples of implementation of the method in accordance with the Invention.

However, it should be clearly understood that these examples are given solely by way of illustration of the subject of the Invention, of which they do not in any way constitute a limitation.

EXAMPLE 1

IMPLEMENTATION OF DECONTAMINATION METHODS IN ACCORDANCE WITH THE INVENTION DURING THE PREPARATION OF POLYPYRROLE MATRICES BY COPOLYMERIZATION

1) Synthesis of the Oligonucleotides

The synthesis support is composed of a silicon plate carrying 48 gold electrodes which are independent and isolated from one another. Each electrode is a square, the length of the side of which is 25, 50, 100 or 200 $\mu$m.

The localized synthesis is carried out, on each electrode, of a polypyrrole polymer, on which an oligonucleotide is covalently grafted, by copolymerization of oxidized pyrrole nuclei, some of which carry the said oligonucleotide.

The polymerization is carried out, according to the method described in PCT Application WO 94/22889, in a solution containing $2 \times 10^{-2}$ M of pyrrole, $6 \times 10^{-8}$ M of substituted pyrrole (oligonucleotide carrying a pyrrole group, subsequently recorded as pyr) and 0.1 M of $LiClO_4$.

The oligonucleotides carrying the pyrrole at the 5' position (oligonucleotides G-pyr, T1-pyr or T2-pyr) were synthesized according to the method described in PCT Application WO 94/22889 and purified by reversed-phase HPLC.

Sequence of the oligonucleotides used
Oligo G-pyr 5'Pyrrole-CTCCAAGAAAGGACCC 3' (SEQ ID NO. 1)
Oligo T1-pyr 5'Pyrrole-CTCCAGGCATTGAGC 3' (SEQ ID NO. 2)
Oligo T2-pyr 5'Pyrrole-CAACCCAACGCTACT 3' (SEQ ID NO. 3)

The matrix model which was used to study the contaminations is composed of a wafer containing 5 electrodes, each carrying a different deposit, namely, in the order of the syntheses:

Electrode 1: a deposit of pure polypyrrole (negative control);
Electrode 2: a deposit of a copolymer of polypyrrole and of the oligonucleotide G-pyr,
Electrode 3: a deposit of a copolymer of polypyrrole and of the oligonucleotide T1pyr,
Electrode 4: a deposit of a copolymer of polypyrrole and of the oligonucleotide T2-pyr;
Electrode 5: a deposit of pure polypyrrole.

After connecting the electrode on which the deposition will be carried out, the wafer is introduced into the reaction cell in the presence of a platinum counterelectrode and of a calomel reference electrode (SCE) and of 600 µl of reaction mixture optionally comprising the desired oligonucleotides-pyrrole. The reactions of oxidation of the monomer and of reduction of the polymer are provided for by a cyclical variation in the potential between −0.35 and +0.85 V/SCE.

The integration of the current with respect to the time (amount of electrons consumed) makes it possible to evaluate the mass of polymer formed on the surface of the electrode and thus the thickness of the film. This ensures good reproducibility of the syntheses.

After each synthesis, the cell and the wafer are rinsed according to the various procedures described hereinbelow, the electrode used previously is then disconnected and the following electrode is connected. The wafer is then immersed in the reaction mixture comprising another oligonucleotide-pyrrole pair.

After the final specific washing operation, the wafer is disconnected and then rinsed with distilled water.

2) Hybridization and Detection of the Oligonucleotides

The specificity of the deposits is monitored by hybridization of probes complementary to the oligonucleotides attached to the support.

Hybridization:

The hybridization reactions are carried out successively at 40° C. for 15 min, in a final volume of 10 µl of a 20 mM pH 7.4 phosphate buffer, NaCl 300 mM, EDTA 2 mM, SDS 0.5%, in the presence of 0.06 pmol of oligonucleotide biotinylated at the 5' position, respectively complementary to the sequence G, T1 or T2.

Detection:

After hybridization, the wafer is washed at room temperature in the hybridization buffer diluted four fold. After rising in PBS-NaCl 0.4 M, 0.5% Tween 20, the wafer is incubated for 15 min at room temperature in the same buffer in the presence of 2.5 µg/ml of streptavidin-phycoerythrin conjugate. A final rinsing with PBS-NaCl-Tween is carried out and then the wafer is mounted on a microscope slide and then covered with a coverglass.

The matrix is then observed by fluorescence microscopy and the intensity of fluorescence of each point is evaluated.

3) Influence of the Treatment on the Specificity of the Localization of the Fluorescent Signal.

General points:

All the washing operations are carried out on the wafer and the cell, at room temperature and after each polymer synthesis (except when otherwise mentioned), according to one of the following protocols:

1) rinsing with water (identical to that described in PCT Application WO 94/22889).
2) lengthy rinsing with water: five successive rinsing operations with water.
3) electrochemical treatment 1: Overoxidataion of the deposit at 1.2 V/SCE for 1 min and then rising with water.
4) chemical treatment: "mixture S" is a solvent containing 68% of acetonitrile, 16% of ethanol and 16% of water; "mixture S+vit E" is a dilution of a 50 mM alcoholic solution of alpha-tocopherol to 1 mM in the solvent "S"; the treatment is followed by rinsing with water; the vessel is simply rinsed with water.
5) rinsing in the presence of an anionic detergent: rinsing with water and then in a 0.5% sodium dodecyl sulphate (SDS) solution, followed by another rinsing operation with water.
6) rinsing in the presence of a non-ionic detergent: rinsing with water and then in a 0.3% Tween 20 solution, followed by another rinsing operation with water.

b) Results:

Each matrix produced is successively hybridized with the three biotinylated probes complementary to the oligonucleotides G, T1 and T2. Hybridization is detected by determination of the fluorescence intensity, as indicated hereinbelow.

The results are reported in Tables 1A to 1F hereinbelow, which respectively reproduce the results of Experimentations 1 to 6.

In these tables, each column corresponds to one of the electrodes 1 to 5; each line corresponds to one of the probes complementary respectively to G, T1 and T2. The fluorescence intensity of each point is graded from 0 to +++, or V(*,*) if the result is variable and non-reproducible between the two limits specified between brackets.

TABLE 1A

|  | 1 | 2 | 3 | 4 | 5 |
|---|---|---|---|---|---|
| compl. G | v(0, +) | +++ | 0 | 0 | 0 |
| compl. T1 | 0 | v(0, ++) | +++ | 0 | 0 |
| compl. T2 | 0 | 0 | (v0, +) | +++ | 0 |

TABLE 1B

|  | 1 | 2 | 3 | 4 | 5 |
|---|---|---|---|---|---|
| compl. G | V(0, +) | +++ | 0 | 0 | 0 |
| compl. T1 | 0 | V(0, +) | +++ | 0 | 0 |
| compl. T2 | 0 | 0 | V(0, +) | +++ | 0 |

TABLE 1C

|  | 1 | 2 | 3 | 4 | 5 |
|---|---|---|---|---|---|
| compl. G | 0 | + | 0 | 0 | 0 |
| compl. T1 | 0 | 0 | ++ | 0 | 0 |
| compl. T2 | 0 | 0 | 0 | + | 0 |

TABLE 1D

|          | 1 | 2   | 3   | 4   | 5 |
|----------|---|-----|-----|-----|---|
| compl. G | 0 | +++ | 0   | 0   | 0 |
| compl. T1| 0 | 0   | +++ | 0   | 0 |
| compl. T2| 0 | 0   | 0   | +++ | 0 |

TABLE 1E

|          | 1 | 2  | 3  | 4 | 5 |
|----------|---|----|----|---|---|
| compl. G | 0 | ++ | 0  | 0 | 0 |
| compl. T1| 0 | 0  | ++ | 0 | 0 |
| compl. T2| 0 | 0  | 0  | + | 0 |

TABLE 1F

|          | 1 | 2   | 3   | 4   | 5 |
|----------|---|-----|-----|-----|---|
| compl. G | 0 | +++ | 0   | 0   | 0 |
| compl. T1| 0 | 0   | +++ | 0   | 0 |
| compl. T2| 0 | 0   | 0   | +++ | 0 |

These results show that 3 types of treatment are more efficient than the initial treatment (No. 1) in decreasing non-specific reactions due to contaminations:

the treatment involving overoxidation (treatment No. 3)

the rinsing operation in the presence of an antiradical product: vitamin E (treatment No. 4)

the rinsing operations in the presence of surfactants (treatments No. 5 and 6).

---

What is claimed is:

1. Method for reducing the surface reactivity of a copolymer produced by electrochemical copolymerization, which comprises a treatment for total or partial inactivation of the reactive species present at the surface of the said copolymer, wherein said treatment comprises at least one of:
   (1) one antiradical chemical treatment;
   (2) one electrochemical treatment which makes it possible to modify the degree of oxidation of the said polymer; and
   (3) one treatment comprising at least one rinsing operation in the presence of a surfactant.

2. Method according to claim 1 for reducing the surface reactivity of a copolymer of following general formula (I):

(I)

characterized in that it comprises:
   the electrochemical copolymerization of a compound of following general formula (II):

(II)

with a compound [A],
[A] representing a monomer unit of a polymer capable of being produced by electrochemical copolymerization, [B] representing a side group, which can be a monomer or a polymer, bonded to the unit [A] by covalent bond or via a spacer arm, and x and y representing integers equal to or greater than 1; and the treatment of the copolymer produced, in order to completely or partially inactivate the reactive species capable of attaching a unit of formula (II) present at its surface.

3. Method according to claim 2, characterized in that [A] represents a monomer of electronically conductive polymer.

4. Method according to claim 3, characterized in that [A] represents a monomer of electronically conductive polymer chosen from polyacetylene, polyazine, poly(p-phenylene), poly(p-phenylene vinylene), polypyrene, polypyrrole, polythiophene, polyfuran, polyselenophene, polypyridazine, polycarbazole, polyaniline and the substituted derivatives of these polymers.

5. Method according to claim 4, characterized in that [A] is a pyrrole unit.

6. Method according to claim 2, characterized in that [B] represents a nucleotide, an oligonucleotide or one of their derivatives or analogues.

7. Method for the synthesis of an array of copolymers of general formula (I), at least two of which comprise a different side group [B], on the same support, the surface of which is composed of electrodes arranged as a matrix, the copolymers comprising a different side group [B] being carried by different electrodes and being synthesized one after the other, each on its respective electrode-support, by employing a method according to claim 1.

* * * * *

SEQUENCE LISTING

```
<160> NUMBER OF SEQ ID NOS: 3

<210> SEQ ID NO 1
<211> LENGTH: 16
<212> TYPE: DNA
<213> ORGANISM: Artificial/Unknown
<220> FEATURE:
<221> NAME/KEY: misc_feature
<222> LOCATION: ()..()
<223> OTHER INFORMATION: Description of Artificial Sequence:
      synthetic DNA

<400> SEQUENCE: 1
ctccaagaaa ggaccc                                                  16

<210> SEQ ID NO 2
<211> LENGTH: 15
<212> TYPE: DNA
<213> ORGANISM: Artificial/Unknown
<220> FEATURE:
<221> NAME/KEY: misc_feature
<222> LOCATION: ()..()
<223> OTHER INFORMATION: Description of Artificial Sequence:
      synthetic DNA

<400> SEQUENCE: 2
ctccaggcat tgagc                                                   15

<210> SEQ ID NO 3
<211> LENGTH: 15
<212> TYPE: DNA
<213> ORGANISM: Artificial/Unknown
<220> FEATURE:
<221> NAME/KEY: misc_feature
<222> LOCATION: ()..()
<223> OTHER INFORMATION: Description of Artificial Sequence:
      synthetic DNA

<400> SEQUENCE: 3
caacccaacg ctact                                                   15
```